June 10, 1958     H. M. PIKER     2,838,194
INSULATED CONTAINER
Filed Oct. 20, 1954     2 Sheets-Sheet 1
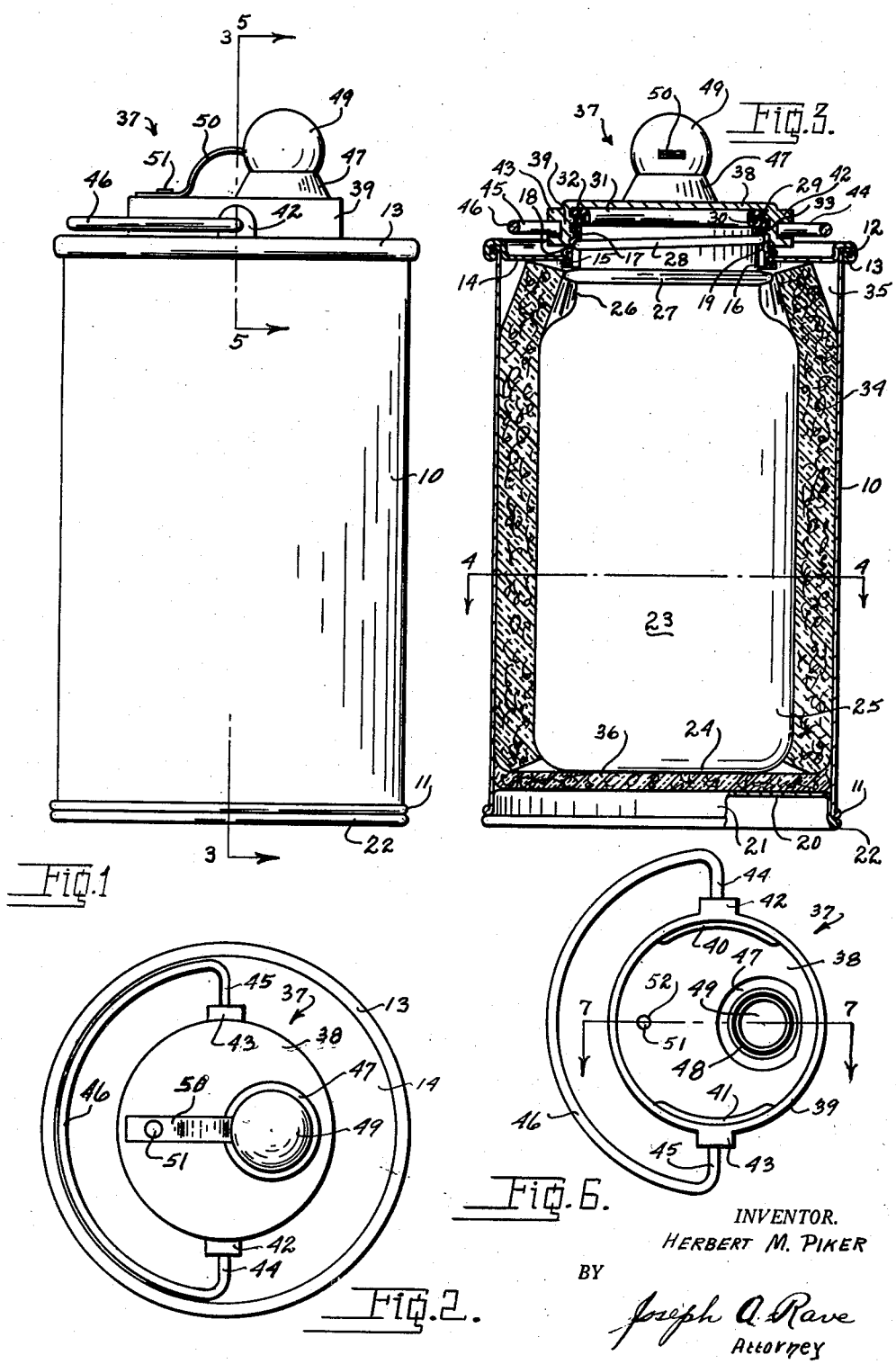
INVENTOR.
HERBERT M. PIKER
BY
Joseph A. Rave
Attorney June 10, 1958 — H. M. PIKER — 2,838,194
INSULATED CONTAINER
Filed Oct. 20, 1954 — 2 Sheets-Sheet 2
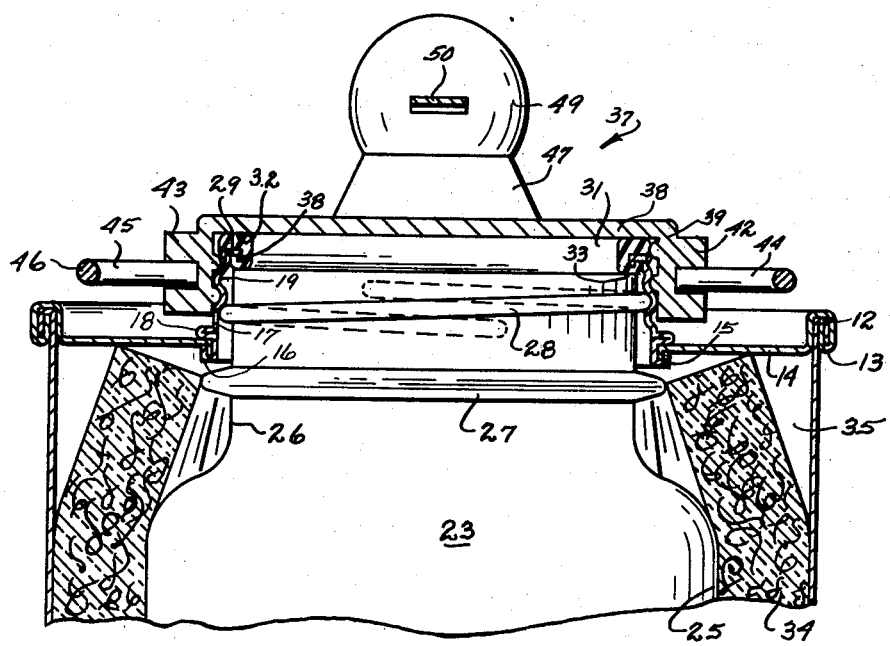
Fig. 5.
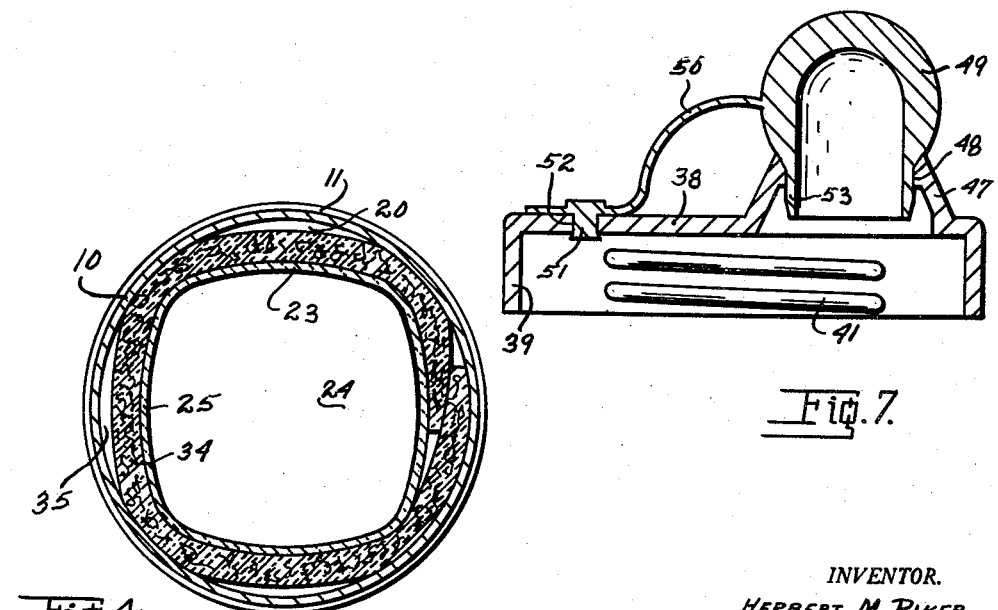
Fig. 4.
Fig. 7.
INVENTOR.
HERBERT M. PIKER
BY Joseph A. Rave
Attorney United States Patent Office 2,838,194
Patented June 10, 1958

2,838,194
INSULATED CONTAINER

Herbert M. Piker, Wyoming, Ohio, assignor to Hamilton-Skotch Corporation, a corporation of Ohio Application October 20, 1954, Serial No. 463,373

5 Claims. (Cl. 215—13)

This invention relates to improvements in an insulated container and particularly to such a container for use as a "jug" for transporting and maintaining liquids in hot or cold condition for a reasonable period of time.

The container of the present invention is popularly known and generally referred to as a "picnic jug" and is generally employed for hot or cold drinks.

The principal object of the present invention is the provision of an insulated container that is mechanically sound and will withstand the usual rough treatment given to containers of the kind of the present invention.

Another object of this invention is the provision of an insulated container for accomplishing the purpose thereof that may be economically produced and therefore economically acquired by users.

Another object of this invention is the provision of an insulated container that may be readily disassembled by the user for the purpose of airing it and maintaining the same in a sanitary condition and which container can be readily reassembled by the average person without the use of tools or implements of any sort.

A further and specific object of this invention is the provision of an insulated container, as hereinabove set forth, in which a glass inner container is employed that is protected from breakage by an outer container through a mounting by suspension of said inner container within said outer container in such a manner that any contact of said inner and outer containers is eliminated and a transfer of shock from said outer container to said inner container is prevented.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is a side elevational view of the insulated container of the present invention.

Fig. 2 is a top plan view of the insulated container of Fig. 1.

Fig. 3 is a vertical sectional view through the insulated container as seen from line 3—3 on Fig. 1.

Fig. 4 is a horizontal sectional view through the container as seen from line 4—4 on Fig. 3.

Fig. 5 is a fragmentary enlarged vertical sectional view through the upper end of the container as seen from line 5—5 on Fig. 1.

Fig. 6 is an inverted or bottom plan view of the closure cap of the container.

Fig. 7 is an enlarged transversion sectional view through the closure cap as seen on line 7—7 on Fig. 6.

Throughout the several views of the drawings similar reference characters are employed to denote the same or similar parts.

The insulated container of the present invention comprises an outer body member or shell 10 in the form of a hollow cylinder having its lower end rolled on itself to form a finish bead 11. The upper end of the body 10 is outwardly turned to form a hook 12 adapted to interfit with a complementary hook 13 formed at the outer periphery of the outer body member top 14. The outer body member top 14 is in the form of a ring and has a central aperture provided by a down turned flange 15, in effect, defining said aperture. The flange 15 is adapted to be received in an upwardly turned portion, or hook, 16 at the lower end of the neck-like member, indicated in generally the reference numeral 17.

The neck-like member 17 is cylindrical in cross section and is provided upwardly of its hook 15 with an outwardly projecting flange 18. In assembling the ring-cover 14 with the said neck-like member 17, the said ring-cover 14 just outwardly of the down turned flange 15 is clamped between the flange 18 and hook 16 as clearly illustrated in Fig. 5. The neck-like member 17, upwardly of the flange 18, is corrugated or rolled to provide screw threads 19. The material of the neck-like member 17, as clearly illustrated in Fig. 5, is of uniform thickness and the forming or rolling of the threads 19 therein provides, simultaneously, internal and external threads for said member and each of which is used for a definite purpose as will presently be made clear.

The lower end of the outer body member or shell 10 is closed by a bottom which is conveniently in the form of a metallic lid having a body 20, with a flange 21 at the periphery of said body and with said flange at its free end rolled on itself to form a bead 22. The exterior diameter of the bottom 20, particularly its flange 21, is such as to snugly enter the lower end of the outer body member or shell 10. The bottom bead 22 is of such exterior diameter as to substantially equal that of the outer body member or shell bead 11 and when the said bottom is in operative position, its bead 22 is in face contact with the outer body member bead 11.

Disposed within the outer body member or shell 10 is a container 23 conveniently in the form of a glass jar, such as is commonly sold and used for home canning purposes and are generally referred to as a "Mason fruit jar." Such a jar is provided with a bottom 24 from the periphery of which upstands the walls 25 and the said bottom may be circular in plan, but is, preferably, and as illustrated in Fig. 4, rectangular in plan and has a wall 25 upstanding from each side or edge thereof.

The said inner container or jar 23 terminates at its upper end in a neck 26, together with a base radial flange 27; for the purpose of the present invention, the radial flange 27 may be omitted. Upwardly of the radial flange 27 the neck 26 is provided with an outwardly projecting rib which forms in effect a screw thread 28. The screw thread 28 is formed to an external dimension to screw or thread into the internal threads of the outer body neck-like member 17.

The upper or free end of the outer body-neck like member 17 is outwardly turned as at 29, having its inner periphery downwardly turned as at 30, and thereby provides the said upper end of the body neck-like member with a relatively flat horizontal surface 29. Disposed on said upper end on the body neck-like member 17, and particularly embracing the flat surface and downturned flanges 29 and 30, is a gasket 31 formed of relatively soft and compressible material, such as rubber. The said gasket is provided with an L-shaped groove to enable it to completely enclose the flat upper surface 29 and the depending flange 30 for thereby providing a soft upper surface 32 and a similar soft lower surface 33.

In practice the outer body member top 15 is applied to the upper end of the outer body member 10 whereupon the said upper end of the outer body member and the outer periphery of the top are rolled on one another in forming the interengaging hooks 12 and 13 and thereby forming a metal seam in securing these parts to one another. It should be noted that the said outer body member top has its body portion depressed for thereby forming a channel around the opening in said top.

The neck-like member 17 is then positioned to interengage the hooks 15 and 16 whereupon these parts are seamed to one another for securing the said neck-like member 17 to the ring cover or top 14 by clamping same between the radial flange 18 and neck-like member hook 16.

The gasket 31 is then applied to the upper or free end 29—30 of the neck-like member 17.

From the foregoing, and particularly after the insertion of the bottom into the lower end of the outer body member, it should be noted that there has been provided an outer container comprising the outer body member 10 having a top 14 from which rises a neck 17.

The inner container or jar 23 is then inserted through the open lower end or bottom of the outer container and its neck threads 28 interengaged with the inner threads of the outer container neck 17. The screwing of the inner container into the outer container neck is continued until the upper end of the inner container neck engages the lower flat surface 33 of the gasket 31. At this time a sheet of insulating material, indicated in the drawings by the reference character 34, is disposed in the space 35 between the outer surface of walls 25 of the inner container 23 and the inner surface of the wall of the outer container body 10. Preferably, however, the inner container 23 is first wrapped in the insulating sheet 34, prior to the insertion thereof within the outer container, and the said insulating sheet 34 and inner container 23 inserted, as a unit, within the outer container and then actuated for engaging the inner container thread 28 with the outer container neck inner thread 17. It will be understood that this threading of the inner and outer containers with one another may be effected without actually actuating or rotating the insulating material 34 with said inner container.

At this time a sheet of insulating material 36 may be disposed against the outer surface of the inner container bottom 24, whereupon the bottom closure member or metalic lid, is pressed into position, as above set forth and as clearly illustrated in Fig. 3.

From the foregoing, it will be readily noted that the inner container has an external dimension materially less in diameter, or width, and height than the internal dimensions of the outer container and with its walls and bottom in positions for providing a space between said inner and outer containers which is substantially filled by the insulating sheets 34 and 36.

It will be understood that a user may reverse the assembly procedure for the purpose of airing and cleaning the insulated container interiorly. In other words, a user would remove the outer container bottom and then proceed to unscrew the inner container, whereupon both the inner and outer containers would be in a position to be cleaned interiorly and exteriorly. In the event of the breakage of the inner container, or "Mason fruit jar," the user would follow the same steps to replace the broken inner container with a new one.

The inner container has its upper end closed by a readily removable closure cap indicated in its entirety by the reference numeral 37. The closure cap 37 comprises a body portion 38 with a depending flange 39 from its periphery. Inwardly projecting from diametrically opposite points are ribs 40 and 41 which, as seen in Fig. 7 incline to the horizontal and in fact incline to the same degree as the external threads on the outer container neck 17. The said ribs 40 and 41 are in fact interrupted threads for threaded engagement with the, as noted above, exterior threads of the outer container neck.

The closure cap has lugs 42 and 43, respectively, projecting from two diametrically opposite points on the exterior of its flange 39, each of which is provided with a socket for respectively receiving the inwardly projecting ends 44 and 45 of a bail handle 46.

In practice the closure cap 37 is removed from the container to permit a filling of the inner container through its neck 36 and, since the said contents are to be discharged in relatively small quantities as compared to its capacity, the said closure cap is provided with a discharge opening. The discharge opening may be formed as part of a funnel-like upstanding lug 47 which is centrally apertured as at 48 to receive a removable cork, stopper, or the like 49. The said stopper 49 is illustrated as having integrally formed therewith a tie or leash 50 having at its other end a plug 51 through which the said cork is attached to the closure cover. The attachment of the tie or leash 50 to the closure cap being effected by inserting the said lug 51 through an aperture 52 in the closure cap body 38.

In practice the container outer body 10, top 14, and bottom 20 are formed of sheet metal, although they may be formed of other material whether moldable or formable by other means. The inner container 23 is preferably formed of glass, as noted above, a well known "Mason fruit jar," or the like and can thereby be readily cleaned and kept clean and sanitary. The closure cap 37 may be made of a moldable synthetic resin compound commonly known as plastic and preferably of the type that is hard and rigid after molding, while the stopper 49, its tie or leash 50, and the securing lug 52 are likewise formed of moldable synthetic resin, but preferably of the type that remains flexible and slightly compressible after formation, so that said stopper may have its reduced end 53 readily pressed into the discharge opening 48. The flexible tie or leash 50 permits the ready withdrawal of the stopper from the discharge opening and permits the ready insertion of said stopper into said opening while the flexible lug 51 affords pressing of the same through its attaching aperture 52 in the closure cap body.

The insulating sheets 34 and 36 may be formed of any acceptable insulating material but are preferably of spun glass which forms an excellent insulating material in the environment herein disclosed.

It will be readily noted from the drawings that the screwing of the closure cap 37 through its interrupted threads 40 and 41 onto the outer container neck is continued until the gasket 31 is compressed or clamped between radial flange 29 of the outer container neck and the under surface of the closure cap body 38.

The insulated container of the present invention, as will be readily noted from the foregoing, comprises a metallic or outer sheath centrally of which is suspended a relatively fragile inner container and which inner container is protected against shock from abuse to the outer container through suitable insulating material which not only absorbs shock but at the same time insulates the inner container from transfer of heat through contact of said inner container with the outer container.

In view of the foregoing, it will be further noted that the objects initially set forth have otherwise been fulfilled.

What is claimed is:

1. In an insulated container, the combination of an outer container having a body portion, an apertured top, a removable bottom and a centrally apertured neck upstanding from said top and concentric with the top aperture, said outer container neck having an inwardly projecting radial flange with an upper and lower surface at the upper end of its central aperture, a gasket carried by the said neck radial flange and simultaneously underlying its lower surface and overlying its upper surface, an inner container centrally of the outer container having a bottom, a body portion upstanding from said bottom and a centrally apertured neck at the upper end of the inner container body portion, means on said outer container neck interiorly thereof receiving the inner container neck for securing said inner and outer containers to one another and suspending said inner container within the outer container and with the upper end of said inner container neck in sealing engagement with the outer container neck gasket portion that underlies the lower surface of said outer container neck radial flange, said inner container being of less external dimensions than the internal dimensions of the outer container so that the inner container has its body portion and bottom, respectively, inwardly spaced from the outer container body portion and bottom, heat insulation in the space between the inner and outer containers body portions and bottoms, and a closure cap having a body portion overlying the outer container neck and with said closure cap body portion in sealing engagement with the outer container neck gasket portion that overlies the upper surface of its radial flange.

2. In an insulated container, the combination of an outer container having a body portion, an apertured top, a removable bottom and a centrally apertured neck upstanding from said top and concentric with the top aperture, said outer container neck having an inwardly projecting radial flange with an upper and lower surface, a gasket carried by the said neck radial flange and simultaneously underlying its lower surface and overlying its upper surface, an inner container centrally of the outer container having a bottom, a body portion upstanding from said bottom and a neck at the upper end of the inner container body portion, means on said outer container neck interiorly thereof receiving the inner container neck for securing said inner and outer containers to one another and suspending said inner container within the outer container and with the upper end of said inner container neck in sealing engagement with the outer container neck gasket portion that underlies the lower surface of said outer container neck radial flange, said inner container being of less external dimensions than the internal dimensions of the outer container so that the inner container has its body portion and bottom, respectively, inwardly spaced from the outer container body portion and bottom, heat insulation in the space between the inner and outer containers body portions and bottoms, a closure cap having a body portion overlying the outer container neck and with said closure cap body portion in sealing engagement with the outer container neck gasket portion that overlies the upper surface of its radial flange, and a bail handle carried by the closure cap to afford translation of the insulated container.

3. In an insulated container, the combination of an outer container having a body portion, an apertured top, a removable bottom and a centrally apertured neck upstanding from said top and concentric with the top aperture, said neck being formed of sheet material of uniform thickness and having formed therein a spiral groove forming in said neck an internal thread and an external thread, an inwardly projecting radial flange from the upper end of the neck central aperture with said flange having an upper and a lower surface, a gasket on said neck radial flange having a portion underlying the flange lower surface and a portion overlying the flange upper surface, an inner container centrally of the outer container having a bottom, a body portion upstanding from said bottom and a centrally apertured neck at the upper end of the inner container body portion, said inner container neck having an outwardly projecting spiral rib forming an external thread in threaded engagement with the outer container neck internal thread for securing said inner and outer containers to one another and suspending said inner container within the outer container, said inner container neck having its upper end in sealing contact with the outer container neck gasket portion that underlies the said outer container neck radial flange lower surface for effecting a seal between said inner and outer container necks, said inner container being of less external dimensions than the internal dimensions of the outer container so that the inner container has its body portion and bottom, respectively, inwardly spaced from the outer container body portion and bottom, heat insulation in the space between the inner and outer containers body portions and bottoms, and a closure cap having a body portion and a peripheral flange provided with an internal thread on the external thread of the outer container neck and with said closure cap body portion in sealing engagement with the outer container neck gasket portion that overlies the upper surface of the radial flange.

4. In an insulated container, the combination of an outer container having a body portion, an apertured top, a removable bottom and a centrally apertured neck upstanding from said top and concentric with the top aperture, said neck being formed of sheet material of uniform thickness and having formed therein a spiral groove forming in said neck an internal thread and an external thread, an inwardly projecting horizontal radial flange from the upper end of the neck central aperture with said flange having an upper and a lower surface, a depending flange at the inner periphery of the radial flange, a gasket on said neck flange having a portion underlying the flange lower surface, a portion overlying the flange upper surface and a portion to embrace the depending flange, an inner container centrally of the outer container having a bottom, a body portion upstanding from said bottom and a centrally apertured neck at the upper end of the inner container body portion, said inner container neck having an outwardly projecting spiral rib forming an external thread in threaded engagement with the outer container neck internal thread for securing said inner and outer containers to one another and suspending said inner container within the outer container, said inner container neck having its upper end in sealing contact with the outer container neck gasket portion that underlies the said outer container neck radial flange lower surface for effecting a seal between said inner and outer container necks, said inner container being of less external dimensions than the internal dimensions of the outer container so that the inner container has its body portion and bottom, respectively, inwardly spaced from the outer container body portion and bottom, heat insulation in the space between the inner and outer containers body portions and bottoms, and a closure cap having a body portion and a peripheral flange provided with an internal thread cooperatively engaging the external thread of the outer container neck and with said closure cap body portion in sealing engagement with the outer container neck gasket portion that overlies the upper surface of the radial flange.

5. In an insulated container, the combination of an outer container having a body portion, an apertured top, a removable bottom and a centrally apertured neck upstanding from said top and concentric with the top aperture, said neck being formed of sheet material of uniform thickness and having formed therein a spiral groove forming in said neck an internal thread and an external thread, an inwardly projecting horizontal radial flange from the upper end of the neck central aperture with said flange having an upper and a lower surface, a depending flange at the inner periphery of the radial flange, a gasket on said neck flange having a portion underlying the flange lower surface, a portion overlying the flange upper surface and a portion to embrace the depending flange, an inner container centrally of the outer container having a bottom, a body portion upstanding from said bottom and a centrally apertured neck at the upper end of the inner container body portion, said inner container neck having an outwardly projecting spiral rib forming an external thread in threaded engagement with the outer container neck internal thread for securing said inner and outer containers to one another and suspending said inner container within the outer container, said inner container neck having its upper end in sealing contact with the outer container neck gasket portion that underlies the said outer container neck radial flange lower surface for effecting a seal between said inner and outer container necks, said inner container being of less external dimensions than the internal dimensions of the outer container so that the inner container has its body portion and bottom, respectively, inwardly spaced from the outer container body portion and bottom, heat insulation in the space between the inner and outer containers body portions and bottoms, a closure cap having a body portion and a peripheral flange provided with an internal thread cooperatively engaging the external thread of the outer container neck and with said closure cap body portion in sealing engagement with the outer container neck gasket portion that overlies the upper surface of the radial flange, and a bail handle carried by the closure cap.

References Cited in the file of this patent

UNITED STATES PATENTS

| | | |
|---|---|---|
| 922,125 | Friedrich | May 18, 1909 |
| 1,639,529 | Payson et al. | Aug. 16, 1927 |
| 1,683,034 | Horlick | Sept. 4, 1928 |
| 1,814,080 | Danco | July 14, 1931 |
| 2,207,543 | Knapp | July 9, 1940 |
| 2,695,719 | Faris | Nov. 30, 1954 |

FOREIGN PATENTS

| | | |
|---|---|---|
| 19,857 | Great Britain | 1907 |